May 23, 1967  L. R. JENSEN ETAL  3,321,032
GANG DRILL, TRACING AND RIVING MACHINE
Filed Oct. 16, 1963  4 Sheets-Sheet 4

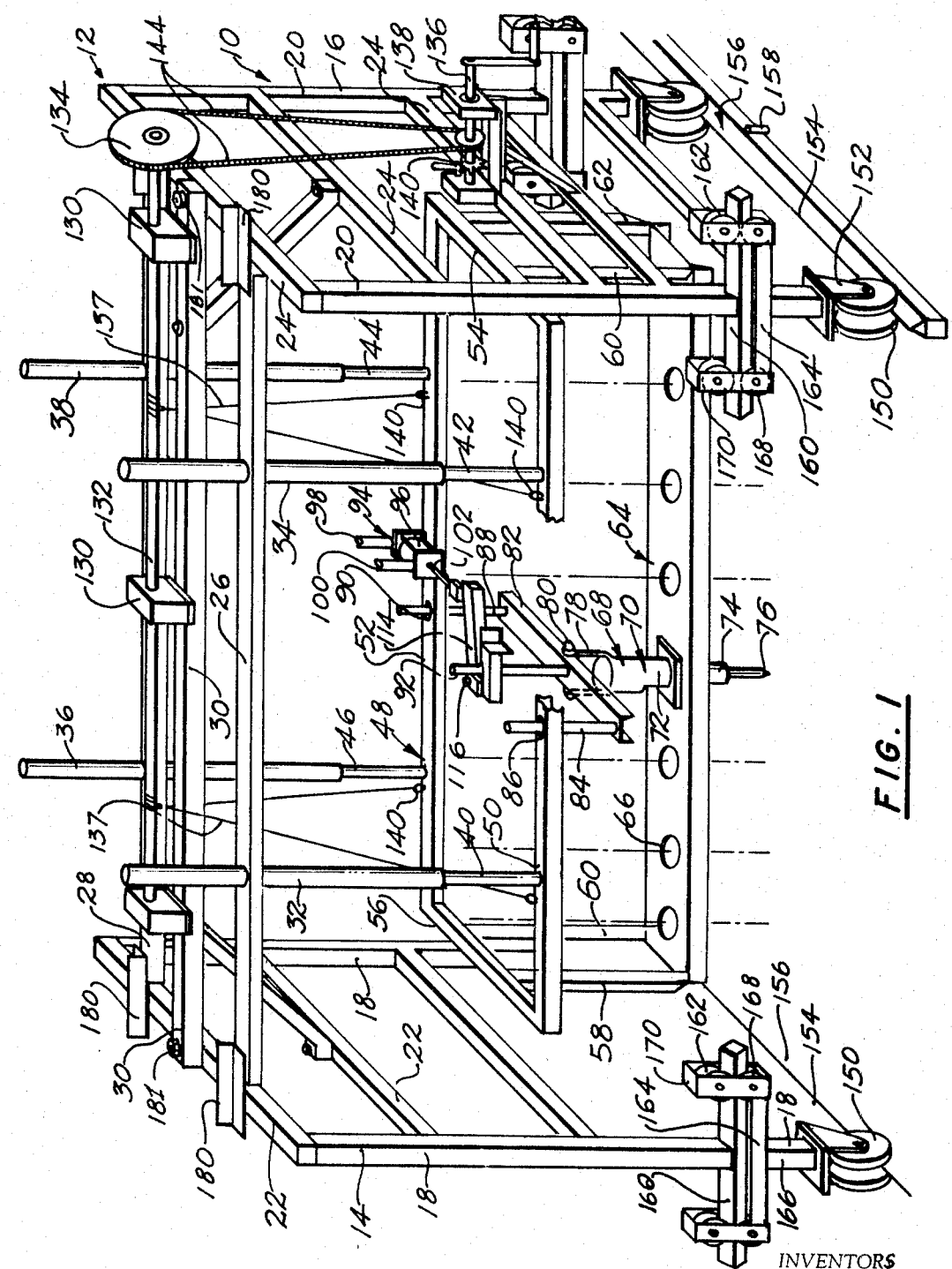

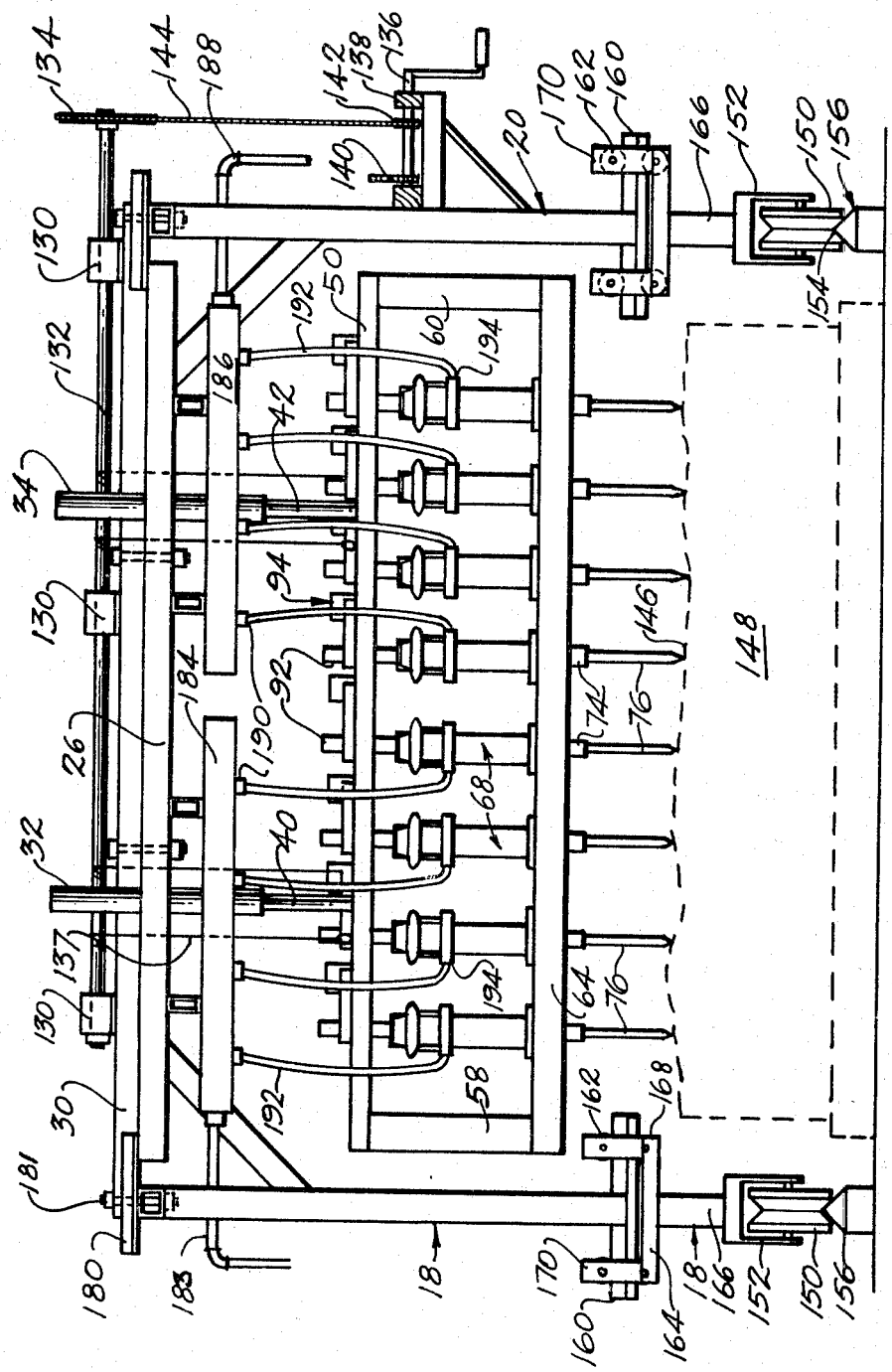

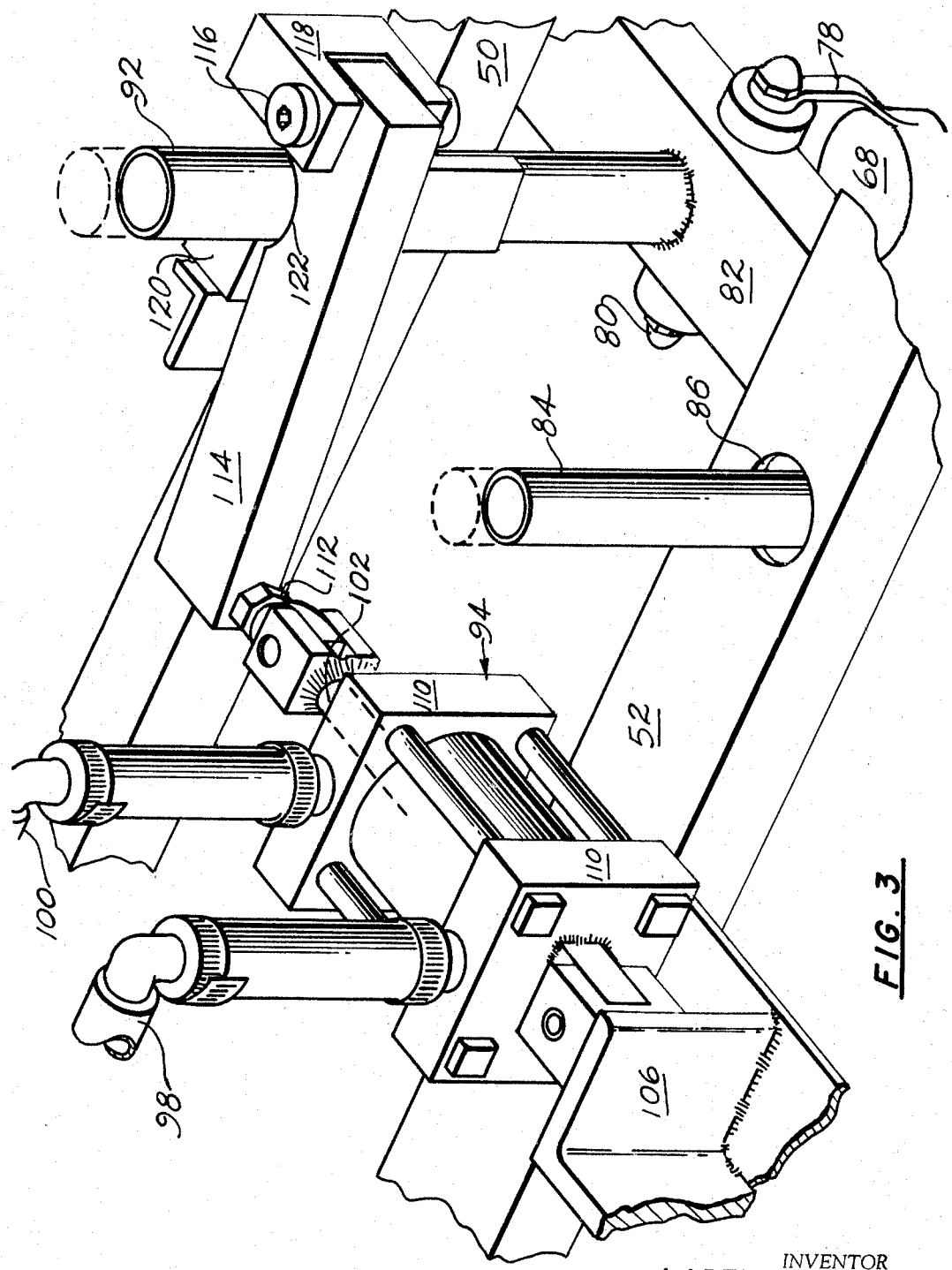

INVENTORS
LADELL R. JENSEN
WILLIAM T. ABBOTT
BY
ATTORNEY 3,321,032
GANG DRILL, TRACING AND RIVING
MACHINE
Ladell R. Jensen, De Kalb County, Ga. (Box 104, Lithonia, Ga. 30058), and William T. Abbott, De Kalb County, Ga. (2374 S. Stone Mountain-Lithonia Road, Rte. 3, Lithonia, Ga. 30058)
Filed Oct. 16, 1963, Ser. No. 316,751
1 Claim. (Cl. 173—52)

This invention relates to a gang drill, tracing, and riving machine and particularly to a machine which may be used in stone quarries to drill a plurality of spaced holes in a particular direction with respect to the stone for the purpose of riving or splitting the stone in a desired direction and to a size determined by the drilling.

In stone quarrying operation, large blocks of granite or other stone are removed from the quarry by means of drilling and other manual operations, not forming per se a part of this invention. These blocks are huge and are difficult to move by large lift trucks to other location where they are cut or split into smaller pieces. In some localities street curb stones are made from stone such as granite and must necessarily be cut to approximately the same width and a somewhat standard length. The depth or the thickness of the block can be determined in the quarry but subsequent cutting or splitting into individual lengths of such stone is a time consuming and laborious job which has been done by hand using manual tools or implements such as hand or electric drills or air compressor drills or other equipment. Stone pressing or stone drilling machines are known in the prior art and mostly these are gang drill machines which perforate smooth stone such as marble or the like with holes. One problem with quarry stone in the form taken from the natural deposit is the unevenness of the surface and therefore the difficulty in drilling to the same depth across the length or width of such a large block. The present invention provides a machine which may be located in or near the quarry and which will receive large blocks of stone for positioning therein with respect to the length, width and depth and subsequently be located and adjusted to drill holes in the stone in a particular line or location. The machine also is readily adjustable as to the direction of the line of drilling and may be adjusted when drilling a large block to compensate for angular irregularity and other factors. In addition, the present machine is so arranged that all of the drills contact the irregular surface of a stone at the same time and therefore drill the same distance of hole.

An object of this invention is to provide a stone drilling machine which receives a large block of stone and is adjustable to drill aligned holes across the stone in whatever thickness is desired between adjacent drillings.

A further object of this invention resides in the construction and arrangement of the machine for drilling stone whereby all of the drills touch the surface of the stone at the same time and all drill to the same depth.

A further object of this invention resides in the arrangement of the machine frame over a block of stone whereby the line of drills may be adjusted angularly with respect to a reference line to adjust for irregularity and to allow for change in angularity of drilling. The adjustment in angularity prevents the maximum number of individual stone sections from an irregular large block of stone.

Another object of the invention resides in the attachment which may be placed on the machine for tracing and which is readily positionable thereon and readily used and removed therefrom at any time.

Another object of the present invention resides in the simple and expedient mechanical arrangement for bringing the gang of drills into drilling engagement and for retracting them therefrom with a minimum of difficulty and with a maximum of safety to the operator.

Still another object of this invention is to provide a stone drilling machine utilizing compressed air available from a portable air compressor to lock the gang drills in drilling position and to operate the drills.

An additional object of this invention is found in the arrangement of the machine frame as to the adjustment forwardly and rearwardly and also angularly whereby stones may be located without extreme accurate alignment and then the machine may be aligned with the position of the stone.

An extra feature of the present machine resides in a means whereby the drills may be moved from side-to-side to trace and to mark a line on the stone where it is to be drilled, and also may cause an invisible crack in the stone, to prepare for the riving operation.

Another feature of the machine is found in the arrangement whereby the drills may be used as riving wedges together with shims that may be attached to the drills.

It is to understood that the above operations and features may be used in sequence or separately and that one may be done without the other depending upon the use of the machine and the particular stone quarry or other location.

Other and further objects of my invention will become apparent upon reading the following specification taken in conjunction with the accompanying drawings, in which:

FIG. 1 is a perspective view of the machine of the present invention showing only one of the drills and clamping arrangement with others diagrammatically illustrated by dashed lines.

FIG. 2 is a front elevation view of the machines shown in FIG. 1.

FIG. 3 is an enlarged perspective view of the selective lock or clamp arrangement for each drill on the machine whereby positioning on uneven blocks of stone is obtained.

Figure 7:
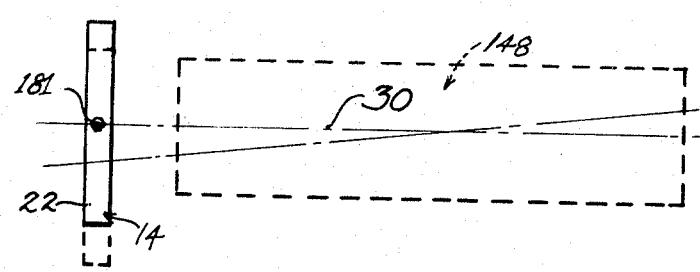
FIG. 7 is a diagrammatic top plan view of a dotted block of stone showing how the machine frame may be adjusted pivotally to change the line of direction of drilling of the tips of the drills.

Referring initially to FIG. 1, the machine designated generally by the reference numeral 10 comprises a somewhat rectangular machine frame 12 which may be constructed from steel angle iron or other suitable material and which comprises side frames 14, 16 of rectangular construction having vertical members 18, 20, respectively, at the front and rear and respective members 18 and 20 being joined by longitudinal connecting and braces 22, 24 welded or otherwise attached thereto forming rigid side frames.

The top memberse 22, 24 of each of the side frames 14, 16 are connected transversely by top transverse frame members 26, 28 at the front and rear and by a center support, transverse member 30 substantially in the middle spaced transversely across front transverse member 26 is a pair of elongated sleevs or sockets 32, 34 welded or otherwise attached thereo and similar members 36, 38 are attached at the opposite sides of rear member 28 and in longitudinal alignment with respective members 32, 34. Each of the members 32, 34, 36, 38 receives therein from the bottom a respective rod 40, 42, 44, 46, all having the lower ends thereof welded at spaced positions on a movable drill frame 48 comprising transverse drill frame members 50, 52 to which respective rods 40, 42 and 44, 46 are welded or otherwise attached. Frame members 50, 52 are connected at their endes by other, longitudinal frame members 54, 56 from which depend vertical, spaced pairs of frame members 58, 60 and 62 supporting a lower drill platform or shelf 64 constructed from angle iron or other suitable material and having a plurality of openings and drill positions 66 across the width, transversely thereof each receiving a drill unit 68.

Each drill unit 68 comprises a conventional pneumatic drill head 70 which may be obtained from any number of commercial manufacturers and which comprises a body or housing 72 of substantially cylindrical construction in which is an air driven mechanism not shown adapted to rotate a drill chuck 74 in which is positioned removably a stone drill 76. It is to be understood that the details of this pneumatic, air drill head 68 does not per se form any part of this invention since it is standard equipment and may be obtained commercially on the market. The top of each drill head 68 is formed with spaced supports 78 pivotally attached by pivot pin 80 to a drill head support member 82 of substantial U-shaped construction and having attached at the front thereof a rod or guide pin member 84 passing through an opening 86 formed in frame member 50. The rear of member 82 has a second rod 88 passing through an opening 90 in frame member 48 and the two rods 84, 88 are guide members preventing unwanted displacement or torque movement of the drill and guiding it sufficiently accurately vertically on the frame. As is readily seen in FIG. 1 and in more detail in FIG. 3 as to certain parts, each drill apparatus has a main and central drill control shaft 92 extending vertically substantially medially from the frame member 82 upwardly between the frames 50, 52. Each shaft 92 is adapted to be contacted by and locked in position by means of a pneumatic or hydraulic control arrangement designated generally by reference numeral 94.

Control apparatus 94 comprises a double acting pneumatic piston 96 which per se forms no part of this invention since it is obtained commercially on the market and is adapted to be actuated in one direction by fluid such as air flowing in one line 98 and to be reversed by means of directing the fluid in the other line 100 whereby a piston rod 102 may be pushed outwardly in one direction or pulled inwardly according to the direction of flow of the air or hydraulic fluid in lines 98, 100. Piston arrangement 94 is mounted on frame member 52 braced by means of brackets 106 and welded between frame member 52 and cylinder blocks 110. Piston rod 102 is adjustably connected by means of a bracket connector arrangement 112 to a locking lever 114 pivotally attached by a pivot 116 to a fixed block 118 welded on frame member 50. Also mounted on frame member 50 is a locking block 120 positioned to place a portion of shaft 92 between it and a curved face 122 in member 114 whereby pressure exerted on member 114 from the piston rod 102 in cylinder arrangement 94 will lock or latch shaft 92 in whatever vertical position it happens to be at the time the cylinder arrangement 94 is actuated. In a preferred embodiment rod 92 would be made of steel as would the member 114 and the block 120 thereby providing a steel contact of dry frictional engagement securely latching shaft 92 in place. Since shaft 92 is in effect the top end of the drill head 68, latching of the member 92 in position fixes the position of the drill bit or drill member 76 at that particular time.

Frame member 30 is provided laterally or transversely thereon with a plurality of pillar blocks 130 in which is located and through which passes an elongated control shaft 132 having the end thereof supporting and fixed thereto a sprocket 134. A crank member 136 mounted on blocks 138 on frame members 24 has a ratchet and pawl attachment 140 associated therewith and also a small sprocket member 142 attached by a chain 144 with upper sprocket 134. Shaft 132 at two locations spaced transversely across the frame 12 receives wrapped thereabout control cables 137 having the ends thereof attached by eye bolts 140 to spaced positions on respective frame members 50, 52. With hte foregoing arrangement, a turning of crank 136 in one direction wraps the cable 137 around the shaft 132 thereby pulling the entire frame 48 upwardly controlled and guided by the respective rods 40, 42, 44, 46 in their respective cylinders 32, 34, 36, 38. Cranking of crank 136 in the opposite direction lowers the frame 48 which carries all of the drill heads 70 mounted together on the platform 64 but arranged separately with respect to the position of the drill in its respective hole 66 as adjusted by means of control rod 92 and the cylinder arrangement 94. Thus, as is apparent from FIG. 2, the entire frame 48 is lowered by cranking crank 136 to bring the tips of the drills 76 into engagement with the top 146 of a large block 148 of granite or other stone which has been cut and transferred from the quarry. In bringing the drill 76 into position, initially all of the drills are loose in the clamping apparatus 114, 122, 120 until the drills have contacted the surface 146 of stone 148 which is apparent visually. As each drill 76 contacts the stone it stops at the tip and the member 82 moves relatively downwardly with hte frame and platform 64 permitting the other drills also to contact the surface at their particular location. This is an important feature because it places each drill tip in position at its respective spot on the top 146 prior to drilling thereby assuring that each drill will reach the same depth from the top when the drilling is stopped.

Frame members 18, 20, each has on the bottom thereof a bottom sheave wheel or pulley wheel-type arrangement 150 mounted on a support 152 and each wheel 150 rests on the edge 154 of an angle iron track 156 fastened on the ground by means of railroad spikes 158 or any other suitable arrangement.

Each frame member 18, 20, respectively, is divided at the bottom and separated by means of a transverse adjustment comprising a rectangular, steel tube member 160 welded to the bottom end of frame member 18 slidably mounted in a bracket arrangement 162 having a transverse wheel support member 164 fastened to the bottom leg 166 of frame member 18 and having rollers 168 therein supporting the bottom edge of tube 160 the top edge of which contacts other rollers 162 held on the top by opposed bracket members 170 fastened to member 164. A similar arrangement is found on all four corners of the frame 12 thereby making the entire frame 12 and the whole machine movable forwardly and rearwardly or longitudinally along track 156 and the entire frame being shiftable transversely moving tube 160 on each of the respective frame members 18, 20 transversely in a respective roller set 168, etc.

In addition, top frame members 26, 28 are not rigidly attached at their ends to frame members 22, 24 but merely fasten thereover loosely by means of short angle iron pieces 180. The main frame member 30 is connected by large pivot bolts 181 to each of the respective frame members 22, 24 thereby making the respective side frames 14, 16 pivotally adjustable about the bolts 181 to place the frames 22, 24 about respective pivots 182 which includes the bolts 181 at a different angle with respect to each other placing the drill platform 64 at a different angle relative to an initial straight line through the centers of drill points 66 when frame members 18 and 20 are in perfect parallel and rectangular alignment. This permits adjustments to be made in the angle of the holes drilled as the entire frame is moved from drill position to drill position across the track 156. The result of this is to permit better adjustment of the blocks being cut and to make better use of the thickness to avoid irregular slabs and to use up as much of the block as possible with substantially equal pieces.

Air is delivered for the operation of each of the drill units 68 by means of a main air line 183 which may supply air from a conventional portable, gasoline or diesel driven air compressor (not shown) through to a header 184 on one side and to a header 186 on the other side through a supply pipe 188 on that side. Each of the headers 184, 186 have individual outlet nipples 190 supplying flexible air hoses 192 leading to the inlet connections 194 of the drill heads 70. Manual air control devices themselves are well known in the art and per se do not form any part of this invention. They comprise generally an air valve which has either a trigger type actuating member or a push button member or may be operated from solenoid operated electric push buttons which perform the actual opening and closing of air valves. This specific arrangement is not shown in the drawings as it is considered obvious and any commercial air valve supplier or manufacturer will readily furnish diagrams and instructions for connecting the headers 184, 186 and the supply pipes 182, 188 to control valves actuated by the operator preferably in the vicinity of the hand crank 136. It has been stated previously that the cylinder arrangements 94 have two separate lines 98, 100 whereby the piston rod 102 is double acting and if through the controls air is directed in one line the piston rod 102 will move outwardly and if through controls air is directed through the other line the piston rod 102 will be pulled inwardly and through this arrangement the latching or locking mechanism is operated in the manner previously described. Air is supplied from the headers 184, 186 to the control valves arrangements 94 and their respective lines 98, 100 as well as to the drill heads 70 for the purpose of rotating the drill 76.

One preferred type of drill head 70 is the so-called impact drill wherein an anvil device strikes the mechanism on the drill and causes an impact in addition to or rather than the straight rotation obtained by some other drills. These impact drills may be locked from rotation but impact will still be delivered to the drill. This is useful in tracing and riving described herein, as well as in ordinary drilling where drills are apt to get jammed or stuck.

Tracing

Figure 4:
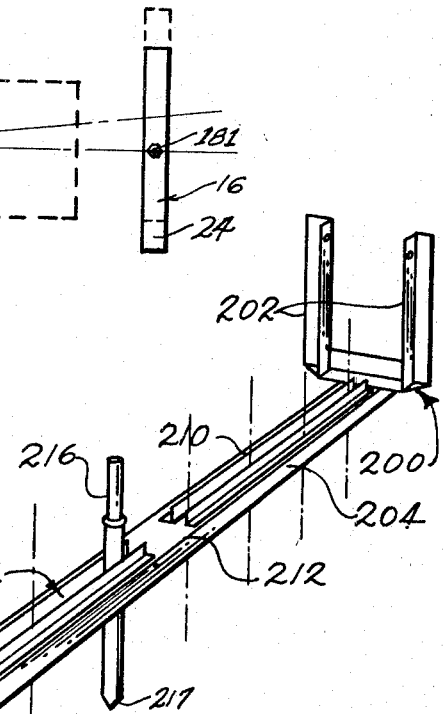
FIG. 4 is a perspective view of an attachment for the machine shown in FIG. 1 for use in tracing.

In FIG. 4 there is shown an attachment for the present machine comprising a frame 200 having frame members, side frame mambers 202 and longitudinal frame members 204. Frame members 202 are constructed from angle iron and are welded or otherwise fixed to a short member 206 attached by welding or otherwise to the longitudinal members 204. Longitudinal members 204 comprise angle iron members 208, 210 fastened together by webs 212 or other members to form a slot 214 in which is mounted the tracing bits 216 which are flattened on one or more sides to fit into the slot 214 which prevents bits 216 from rotating but allows bits 216 to move upwardly or downwardly. The attachment 200 is fitted to the bottom of the frame on platform 64 and receives the drill bits in the slot 214 thereof. Attachment 200 is used for tracing which is an operation marking a substantially straight line across the length of the stone and which may put an invisible crack in the stone to assist in the riving or splitting process which comes next. In FIG. 7 there is shown diagrammatically a typical block of stone blank which is drilled by the drill members 76 in a line determined by the position of the side frames 14, 16 which are adjustable about the pivots 182 to place the angle of the line through the drill centers differently as shown in FIG. 7 in order to adjust for any unevenness in the stone edge. According to this construction, the side frame members 14, 16 may be adjusted and fixed at pivots 182 to place the line of tracing as desired and then the drills 216 are brought into contact with the top of the stone and the entire machine is moved from side-to-side which is also along the length of the stone by moving wheels or rollers 162, 168 travelling on the edges of the frame members. In tracing, it is necessary to move only a distance in one direction to the left hand side for an amount between the distance between adjacent drill tips 216, 217 and then to move in the opposite direction for the additional distance thereby tracing a line from hole to hole which is connected all the way across the stone. It is obvious also if desired that a line may be traced without holes in the stone simply by locating the tips 76 of the drills 216 along the line desired and then moving the frame from side to side sufficiently to connect the respective tracing made by each drill tip. The distance traveled is not very great since the frame moves to the left for a short distance between drill tips and then back to the right for the additional required distance thereby connecting all of the short lines made by the respective drills 216. When tracing is performed, the drill heads 70 and drills 216 are not locked or clamped so the drill tips 217 will ride over the unevenness of the block 148 when moved from side-to-side thereon.

Riving

Figure 5:
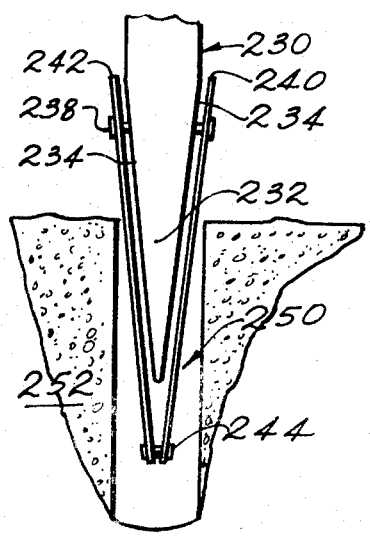
FIG. 5 is a side elevation view of a riving bit having riving shims mounted thereon and inserted in a drilled hole for riving.
Figure 6:
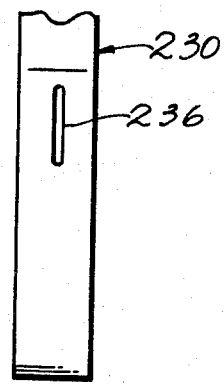
FIG. 6 is a side elevation view of the bit shown in FIG. 5 with the shims removed.

Riving is accomplished in the present machine by changing to the riving bit which consists of a chisel pointed end with shims attached as illustrated in FIGS. 5 and 6. The old method of riving was done by hand and is quite exhaustive and time consuming and generally comprised the procedure of placing separate and loose shims into each drill hole in a line, then placing a wedge between the two shims in each hole and finally driving the wedges by a hand hammer until enough pressure was applied to split or rift the stone.

With the present machine, riving is accomplished more efficiently, as the shims are attached to the wedges (riving bits) which in turn are attached to the pneumatic drills. Referring to FIGS. 5 and 6, the riving bit is designated as reference numeral 230 and comprises a chisel point 232 having opposed flat sides 234 and a longitudinal slot 236 in which is placed a transverse shim pin 238 fastening respective shims 240, 242 onto the chisel point bit 230. The shims 240, 242 are also connected together at the bottom by means of another pin 244. Pins 238, 244 are held in place by lock rings or other fastening devices such as cotter keys or any other suitable means.

With the riving bits 230 in place and the shims 240, 242 fastened thereon, the drill heads 68 with riving bits 230 are lowered into the respective holes 250, formed in the stone 252 and the controls to the air lines or supply pipe 182 are operated to cause the drills to drive the riving bits into the drilled holes 250 until enough pressure has been applied to split or rift or rive the stone from hole to hole across the desired line.

It is to be understood that various types of pneumatic drills are available on the market such as Atlas Copco or Ingersoll-Rand. Some of these are known commonly as impact tools or drills and can be made to impact on torque when stalled or stationary as well as to rotate and the type of drill desired may be selected according to the particular experience of the quarry operator who operates the present machine. In the operation of the tracing attachment shown in FIG. 4, the drills 216 are locked against rotation and it is only the impact or vibration usually imparted through an anvil within the drill, which does the tracing and not any rotation of the drill point itself. Thus in tracing, the drill tips 76 ride over the uneven stone and impact does the tracing.

While we have shown and described a particular embodiment of our invention together with means for drilling, riving, and tracing it is to be understood that these operations may be performed separately and in manner other than the specific way described in this specification, since various alterations, changes, deviations, ramifications, variations, elucidations, and modifications may be made in the embodiments, elements and equipment shown and descdibed in the present specification without departing from the scope of our invention as defined in the appended claim.

We claim:

In a stone drilling machine:
(a) a machine frame comprising a pair of side frames,
(b) at least one longitudinal transverse frame member pivotally connected to said side frames whereby said side frames may be displaced relative to each other,
(c) a drill frame supported for movement on said transverse members toward and away from the stone, and supporting a plurality of individual drills mounted thereon for individual movement with respect to the stone surface,
(d) individual drill clamping means mounted on said frame and operable to clamp each individual drill separately from the others,
(e) said drill head clamping means comprising a fixed block and an arm movable to contact a part of said drill head to clamp same, and
(f) a pneumatic cylinder and piston arrangement on said frame for each clamping means, and having the piston thereof connected to the movable arm,
(g) a control air supply and control means thereon for controlling said pneumatic cylinders,
(h) said drill frame supporting all of said drills as a unit for simultaneous movement thereon in clamped position whereby all of said drills adjust individually to the stone surface prior to drilling,
(i) power means on said frame operable manually to bring said drills into engagement with said stone, and for removal therefrom,
(j) means on said machine for moving said drill frame forwardly and rearwardly with respect to the width of the stone,
(k) other means on said machine for moving said drill frame transversely with respect to the length of the stone, and
(l) said side frames being mounted for adjustment relative to each other to change the angle of said drills with respect to the length of the stone surface.

References Cited by the Examiner
UNITED STATES PATENTS

| 847,339 | 3/1907 | Jones | 125—7 |
| 1,113,828 | 10/1914 | Pratt | 299—38 |
| 1,287,346 | 12/1918 | Krum | 125—7 |
| 1,873,721 | 8/1932 | Postley | 125—23 |
| 2,762,359 | 9/1956 | Entz | 125—23 |
| 2,867,205 | 1/1959 | Vesper | 125—23 |
| 3,101,706 | 8/1963 | Pyle | 125—23 |

FOREIGN PATENTS 287,021  9/1915  Germany.

HAROLD D. WHITEHEAD, *Primary Examiner.*